United States Patent
Dubugnon et al.

(10) Patent No.: US 6,865,278 B2
(45) Date of Patent: Mar. 8, 2005

(54) DEVICE FOR IMPLANTING A MICROPHONE AND A PRESSURE COMPENSATING MEMBER IN A TELEPHONE WATCH

(75) Inventors: Dominique Dubugnon, Etoy (CH); Jean-Pierre Mignot, Peseux (CH); Paul Dinnissen, Schwadernau (CH)

(73) Assignee: Asulab S.A., Bienne (CH)

( * ) Notice: Subject to any disclaimer, the term of this patent is extended or adjusted under 35 U.S.C. 154(b) by 760 days.

(21) Appl. No.: 09/793,963

(22) Filed: Feb. 28, 2001

(65) Prior Publication Data

US 2001/0019945 A1 Sep. 6, 2001

(30) Foreign Application Priority Data

Mar. 2, 2000 (CH) .............................................. 0405/00

(51) Int. Cl.⁷ .............................................. H04R 25/00
(52) U.S. Cl. ....................... 381/189; 381/333; 381/334; 379/437; 379/440
(58) Field of Search .................. 455/90, 344; 379/433, 379/437, 440; 381/311, 334, 357, 358, 365, 387, 189, 333, 355, 386, 388; 181/149, 242; 367/141, 174

(56) References Cited

U.S. PATENT DOCUMENTS

| | | | | |
|---|---|---|---|---|
| 3,987,258 | A | * 10/1976 | Tsutsui et al. | ............... 381/334 |
| 6,018,585 | A | * 1/2000 | Akino et al. | ................ 381/355 |
| 6,512,834 | B1 | * 1/2003 | Banter et al. | ............... 381/386 |

FOREIGN PATENT DOCUMENTS

| | | |
|---|---|---|
| CH | 626 225 | 11/1981 |
| EP | 899 634 | 3/1999 |
| EP | 899 635 | 3/1999 |
| WO | 95/21512 | 8/1995 |

* cited by examiner

*Primary Examiner*—Suhan Ni
(74) *Attorney, Agent, or Firm*—Sughrue Mion, PLLC

(57) ABSTRACT

The device for implanting a microphone (1) and at least one pressure compensating member (2) in a telephone watch consists in placing the microphone and the compensating member close together. A membrane (5) covers the microphone (1) and a disc (6) forms the compensating member (2). The membrane (5) and the disc (6) open at least partially into a single chamber (7) opening onto the outside via an opening (8) in the form of a slot. A liquid (arrow A) can be injected through this slot to rid the chamber, the membrane and the disc of foreign bodies which could accumulate therein.

5 Claims, 2 Drawing Sheets

DEVICE FOR IMPLANTING A MICROPHONE AND A PRESSURE COMPENSATING MEMBER IN A TELEPHONE WATCH

BACKGROUND OF THE INVENTION

The present invention relates to a device for implanting a microphone and at least a first pressure compensating member in a telephone watch enclosed in a case, this microphone being covered with an impermeable membrane and this first pressure compensating member including a hydrophobic disc, said membrane and said disc being in direct communication with the exterior of the telephone watch.

When a microphone and earpiece are implanted in a watch to make it into a telephone watch, the problem of the watch's watertightness arises when it is immersed at a certain depth, a depth limit being generally fixed at thirty meters. The problem of balancing the pressures existing outside and inside the watch also arises when the latter is brought to different altitudes. Immersion and atmospheric pressure are constraints which do not pose major difficulties when dealing with a simple watch, but which however raise questions when this watch is associated with acoustic transducers which are subjected to the same constraints. It will also be mentioned that in a telephone watch, the microphone and earpiece are very close to each other and that measures have to be taken to prevent an internal acoustic feedback.

The aforecited problems have found solutions which are disclosed in European Patent No. 0 899 634 A.

In particular, this document discloses a membrane able to be deformed which covers a microphone. This membrane separates the microphone from an inlet cavity arranged in the watch case, this cavity being in direct communication with the exterior of the watch. Between the membrane and the microphone there is arranged an intermediate space allowing the membrane to be deformed by the action of external static pressure, immersion in water, for example. Deformation of the membrane is however limited, on the microphone side, by a support member. Out of a liquid, the membrane is mounted so as to be able to vibrate freely via the action of the acoustic energy to be received by the microphone. The problem of the microphone's watertightness when immersed is thus resolved while assuring that it operates properly in the open air.

The aforecited document also discloses a hydrophobic disc forming the essential part of a first pressure compensating member between the outside and inside of the watch. This disc must of course be impermeable to liquids, for example when the watch is immersed. This disc must also be permeable to gases whose pressure varies slowly, in order to insulate the air in front of the earpiece (disclosed in European Patent No. 0 899 635 A) from the air behind said earpiece and thus preventing acoustic short-circuiting leading to poor efficiency of the transducer. In practice, this disc constitutes a low pass filter only allowing pressure variations of gases such as air, of very low frequency, typically $\frac{1}{10}$ of a Hz and less, to pass. In order to satisfy the conditions imposed, the disc may for example be made of sintered Teflon (registered trademark) or ceramics.

The same document discloses finally a second pressure compensating member located in proximity to the microphone and in communication on the one hand with the space arranged between this microphone and the deformable membrane which covers it and on the other hand with the inside of the watch. This second member is formed essentially of a similar disc to that described in the preceding paragraph. It will be understood that this disc allows, in particular the microphone to be acoustically insulated from the earpiece because it only allows airs to pass, the pressure of which varies slowly, and thus prevents the aforementioned acoustic feedback. Here however, the hydrophobic quality of the disc is not used since the latter is not in contact with a liquid medium. It will be understood however that in order to simplify things, the same material as that used for the disc fitted to the first pressure compensating member is used.

SUMMARY OF THE INVENTION

The way in which the microphone and the first pressure compensating member are implanted or arranged suffers from a major drawback in the aforecited document. It is to be observed first of all that the microphone and the pressure compensating member are located far from each other. It is to be observed then that the inlet cavity made in front of the membrane covering the microphone opens out on the outside of the watch by a narrow channel arranged at a right angle. Likewise, the first pressure compensating member includes a narrow channel made in the back cover of the watch and ending on the wearer's wrist. Thus, communication between the exterior occurs at two different locations and by narrow channels prone to dirt to the point of making the functions assured by the microphone and the first pressure compensating member inoperable.

The main object of the present invention is to overcome the aforecited drawback. The device for implanting the microphone and the first pressure compensating member thus consists in arranging said microphone and said compensating member in immediate proximity to each other, their respective membranes and discs opening at least partially into a single chamber opening out to the outside of the telephone watch through a long opening made in the case.

Another object of the present invention is a method for cleaning the chamber described in the above paragraph, this method consisting in injecting, through the opening of said chamber, a liquid capable of ridding it of impurities from the exterior, in particular those which could be deposited on said disc and which would adversely affect the proper operation thereof.

BRIEF DESCRIPTION OF THE DRAWING

The features and advantages of the invention will appear now from the following description, made with reference to the annexed drawing and giving by way of explanatory, but non limiting example, an advantageous embodiment of the invention, in which drawing.

DETAILED DESCRIPTION OF THE DRAWING

Figure 1:
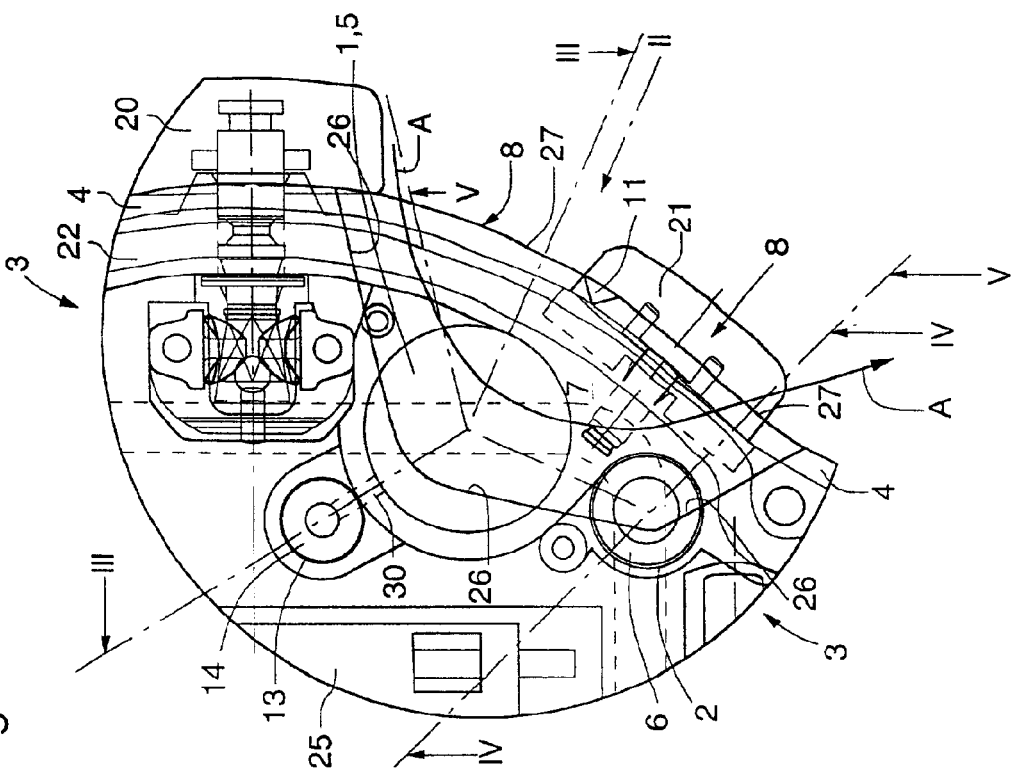
FIG. 1 is a partial plane view of the implanting device according to the invention.

The partial plane view of FIG. 1 shows the interesting part of the invention. It is a portion of a telephone watch 3 including a case 4 housing all the components necessary for the watch and telephone to operate. In particular, FIG. 1 shows the back cover-middle part 4 of this case, a time-setting crown 20, a push button 21, a groove 22 in which a sealing gasket 23 is housed, guaranteeing sealing with respect to a bezel 24 (see FIGS. 2 and 3) and a compartment 25 able to accommodate a SIM card allowing access to a mobile communication system.

Figure 3:
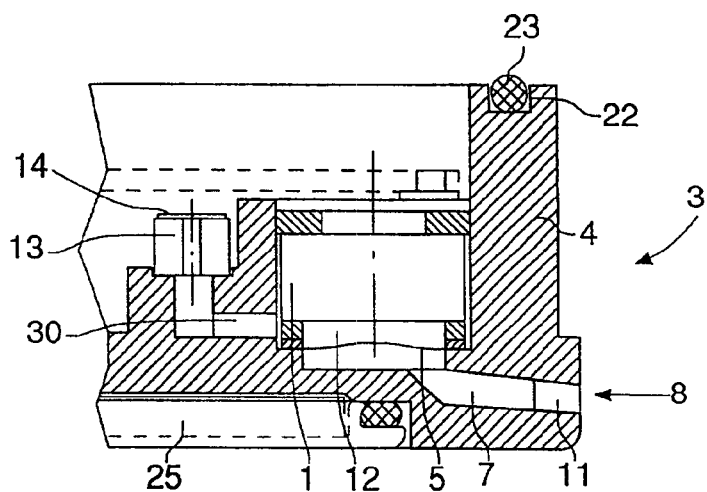
FIG. 3 is a cross-section along the line III—III of FIG. 1.
Figure 4:
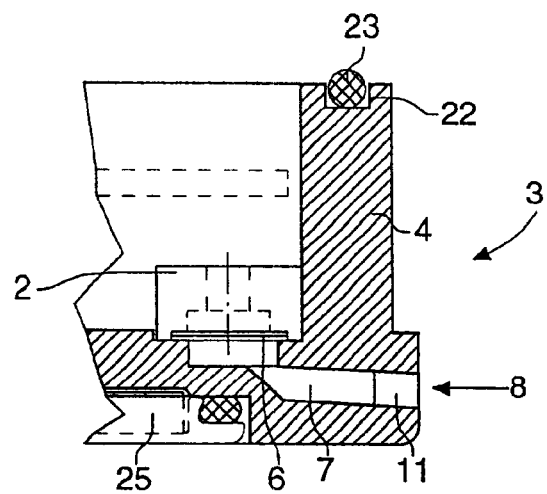
FIG. 4 is a cross-section along the line IV—IV of FIG. 1.

The plane view of FIG. 1, and the cross-section of FIG. 3 made in this plane view, also shows a microphone 1, this microphone being covered with an impermeable membrane 5. FIG. 3 shows that membrane 5 is in direct communication with the exterior of telephone watch 3. FIGS. 1 and 4 show at least a first pressure compensating member 2, this member including a hydrophobic disc 6 which will be discussed hereinafter. Disc 6 is also in direct communication with the exterior of the telephone watch as is seen in FIG. 4.

Figure 5:
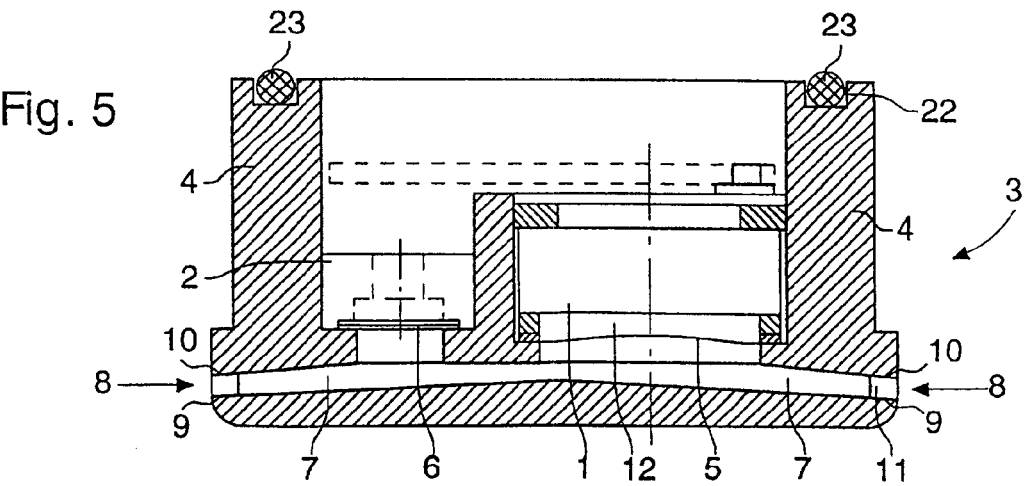
FIG. 5 is a cross-section along the line V—V of FIG. 1.

This being so, the present invention is characterised first in that microphone 1 and pressure compensating member 2 are implanted in immediate proximity to each other. FIGS. 1 and 5 show this fact clearly. This marks a departure from the implantation shown in the aforecited European Patent No. 0 899 634 A wherein these two elements are shown far from each other.

The present invention is also characterised in that membrane 5 covering microphone 1 and disc 6 fitted to pressure compensating member 2 open at least partially into a single chamber 7 which opens out to the outside of the telephone watch through a long opening 8 made in case 4. FIGS. 1 and 5 illustrate this arrangement clearly.

In FIG. 1, chamber 7 is shown in a plane view. It is represented by the broken line 26 which delimits the bottom of the chamber and by the front face of back cover-middle part 4 referenced 27. It can be seen in FIG. 1 that membrane 5 and disc 6 only partly open into chamber 7. It will be noted however that this opening could be greater and extended over the entire surface of the membrane and the disc. Long opening 8 opening onto the outside is delimited in FIG. 1 by the first end of broken line 26 located at that top of the Figure and by the second end of the same line located at the bottom of the Figure.

In FIG. 5, chamber 7 is a cross-section along the line V—V of FIG. 1. it can be seen clearly that membrane 5 and disc 6 open into a single chamber 7 which serves as a common chamber in contact with the exterior via opening 8.

Figure 2:
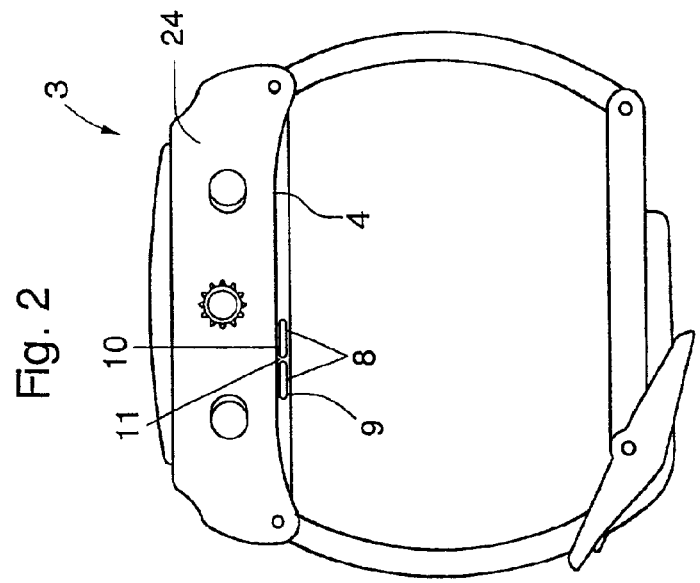
FIG. 2 is a profile view along the arrow II of FIG. 1 of the telephone watch made according to the invention.

As may be suspected when considering in FIG. 1, opening 8 has a slot shown clearly in FIG. 2, which is a profile view along arrow II of FIG. 1. This slot has elongated edges, namely a bottom edge 9 and a top edge 10 (see also FIG. 5). Since this slot is quite long, it was deemed useful, to avoid bending the backcover, to connect edges 9 and 10 by a reinforcing rib 11, this rib being located substantially in the middle of the slot. This rib 11 is visible and referenced in all the Figures.

First pressure compensating member 2 visible in FIGS. 1, 4 and 5 has a so called hydrophobic, i.e. impervious to water, disc 6. It thus guarantees that the watch is waterproof. This disc 6 is however permeable to gases whose pressure varies slowly. The reason for its presence and the working thereof was explained in the preamble of this description, and it is thus unnecessary to repeat these concepts here. However, in the present construction, the surface of the disc has advantageously been increased, on the one hand to minimise the effect of foreign bodies which could be deposited on it, and on the other hand to reduce its time constant so that it balances the internal and external pressure more quickly during abrupt changes in altitude (for example in a fast elevator), while keeping its function of preventing the aforementioned acoustic short-circuiting.

As is seen clearly in FIG. 3, membrane 5 covering microphone 1 defines with said microphone a space 12 in communication with a second pressure compensating member 13, this communication occurring via a channel 30. The reason for the presence of this second member 13 was explained in the preamble of this description. Member 13 thus includes a disc 14 which is permeable to gases whose pressure varies slowly to prevent any acoustic feedback between the earpiece and the microphone internally.

A method for cleaning chamber 7 which opens under the microphone and first pressure compensating member 2 will now be described. For this purpose, there is an opening 8 in the form of a sufficiently long slot to inject liquid therein, water for example, which will rid chamber 7 of foreign bodies or impurities from the exterior. This liquid may at the same time remove undesirable bodies which could have been deposited on membrane 5 and/or disc 6 and which would be detrimental to the proper operation of microphone 1 and/or member 2. Such an operation cannot be envisaged in the watch disclosed in European Patent No. 0 899 634 A since the access channels are too small and above all cannot allow a cleaning fluid to flow therein. Arrow A of FIG. 1 shows a possible direction of the cleaning flow. FIG. 5 also shows clearly all the space available in chamber 7 for said cleaning.

What is claimed is:

1. A telephone watch comprising:

a case having a cavity;

a microphone, having a front face and a rear face, mounted in said case so that said rear face faces said cavity; and at least a first pressure-compensating member having a front face and a rear face, said rear face of said at least first pressure-compensating member facing said cavity, wherein said front face of the microphone is covered with an impermeable membrane, wherein said first pressure-compensating member includes a hydrophobic disc, said impermeable membrane and said hydrophobic disc being in direct communication with an exterior of the case, wherein said microphone and said a least first pressure-compensating member are arranged in immediate proximity to each other, and wherein said impermeable membrane and said hydrophobic disc open at least partially into a single chamber opening out to an outside of the telephone watch through a long opening in said case.

2. The telephone watch according to claim 1, wherein the opening has a slot with elongated edges connected to each other by a reinforcing rib located substantially in the middle of the slot.

3. The telephone watch according to claim 1, wherein the disc fitted to the first pressure-compensating member is impervious to liquids, and permeable to gases whose pressure varies slowly.

4. The telephone watch according to claim 1, wherein the membrane covering the microphone defines therewith a space in communication with a second pressure-compensating member including a disc which is permeable to gases whose pressure varies slowly.

5. The telephone watch according to claim 1, wherein said opening is a slot having a length sufficient to allow circulation of a cleaning fluid, said circulation defining a cleaning flow.

* * * * *